United States Patent
Shotey et al.

(10) Patent No.: US 9,936,735 B1
(45) Date of Patent: Apr. 10, 2018

(54) ELECTRONIC CIGARETTE

(71) Applicant: Bonvi Water, Inc., Scottsdale, AZ (US)

(72) Inventors: Marcus J. Shotey, Scottsdale, AZ (US); Joseph Valasco, Fountain Hills, AZ (US); Daniel Allen, Tempe, AZ (US)

(73) Assignee: BONVI WATER, INC., Scottsdale, AZ (US)

( * ) Notice: Subject to any disclaimer, the term of this patent is extended or adjusted under 35 U.S.C. 154(b) by 36 days.

(21) Appl. No.: 15/146,661

(22) Filed: May 4, 2016

Related U.S. Application Data

(60) Provisional application No. 62/156,766, filed on May 4, 2015.

(51) Int. Cl.
*G01K 7/22* (2006.01)
*A24F 47/00* (2006.01)
*H02J 7/00* (2006.01)

(52) U.S. Cl.
CPC .............. *A24F 47/008* (2013.01); *G01K 7/22* (2013.01); *H02J 7/0052* (2013.01); *H02J 2007/0062* (2013.01)

(58) Field of Classification Search
CPC ........ A24F 47/008; A24F 47/00; A24F 15/18; A24F 47/002; A24F 9/16; A61M 11/042; A61M 15/06; A61M 2205/3368; A61M 2205/8206; A61M 2016/0024; A61M 2205/3375; A61M 11/041; A61M 15/0065; A61M 16/161
See application file for complete search history.

(56) References Cited

U.S. PATENT DOCUMENTS

| | | | |
|---|---|---|---|
| 8,156,944 B2* | 4/2012 | Han | A24F 47/008 131/273 |
| 8,973,587 B2* | 3/2015 | Liu | A24F 47/008 131/273 |
| 2013/0298905 A1* | 11/2013 | Levin | A24F 47/008 128/202.21 |
| 2015/0101606 A1* | 4/2015 | White | A61M 15/00 128/203.26 |
| 2015/0128969 A1* | 5/2015 | Chapman | A24F 47/008 131/329 |
| 2015/0209530 A1* | 7/2015 | White | A61M 11/042 424/729 |

(Continued)

*Primary Examiner* — Truc Nguyen
(74) *Attorney, Agent, or Firm* — Booth Udall Fuller, PLC

(57) ABSTRACT

An electronic cigarette includes a housing, a heating assembly, a mouthpiece and a vapor passage. The heating assembly is positioned within the housing and adapted to heat a liquid solution sufficient to transform the liquid solution to a vapor. The mouthpiece is detachably coupled to the housing and includes a heat sink, an external mouthpiece opening, and a vapor channel recessed into the heat sink and in fluid communication with the external mouthpiece opening. The vapor passage extends from the heating assembly towards the mouthpiece. The vapor passage is in fluid communication with the vapor channel and adapted to pass vapor from the heating assembly to the vapor channel such that when vapor is withdrawn through the external mouthpiece opening, the vapor passes through the vapor passage, through the vapor channel recessed into the heat sink, and through the external mouthpiece opening.

19 Claims, 5 Drawing Sheets

(56) References Cited

U.S. PATENT DOCUMENTS

| | | | |
|---|---|---|---|
| 2015/0313282 A1* | 11/2015 | Ademe | A24F 47/008 |
| | | | 131/329 |
| 2016/0050975 A1* | 2/2016 | Worm | A61M 15/06 |
| | | | 131/328 |
| 2016/0331025 A1* | 11/2016 | Cameron | A24F 47/002 |
| 2017/0027224 A1* | 2/2017 | Volodarsky | A24F 47/008 |

* cited by examiner

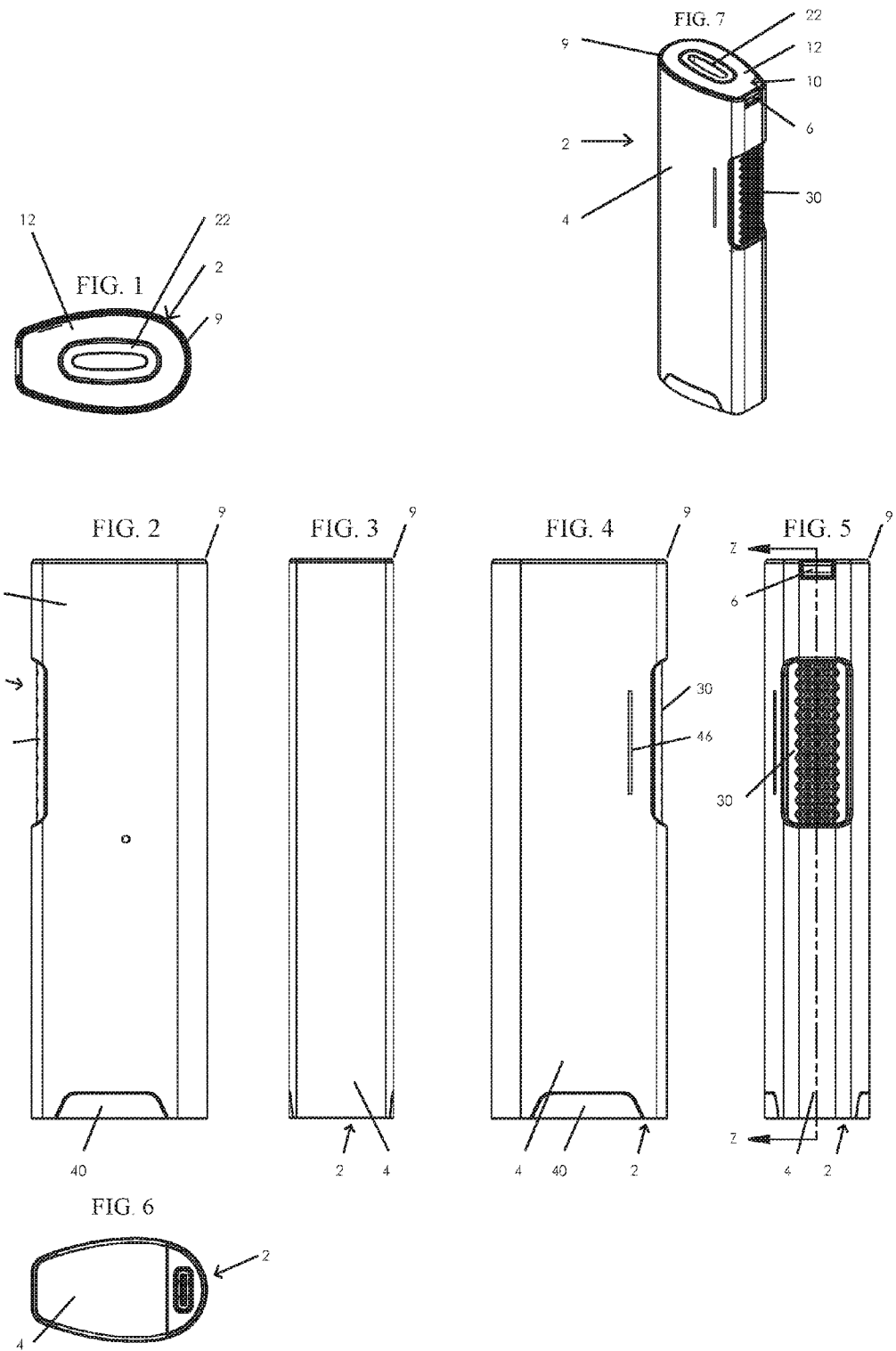

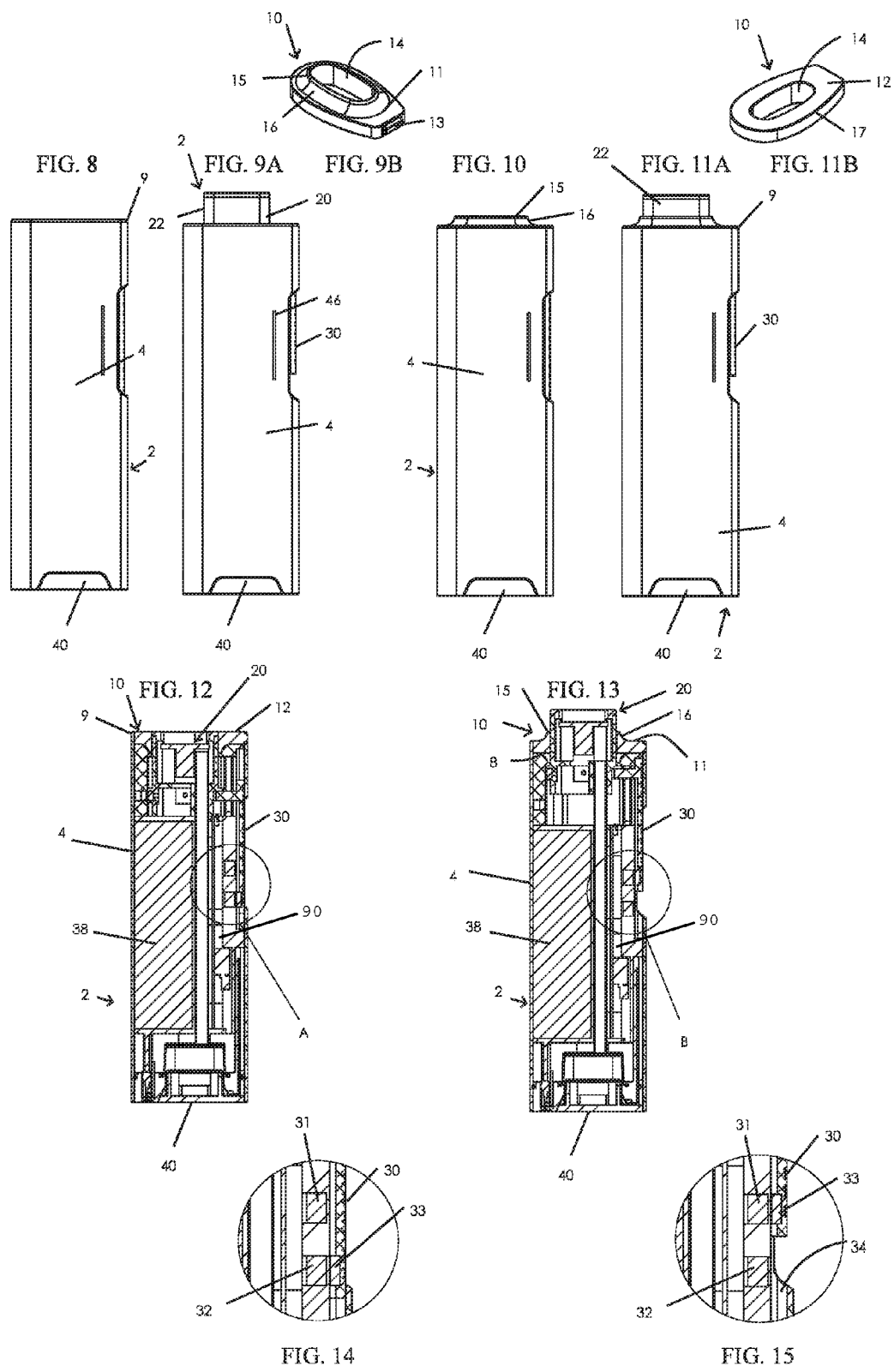

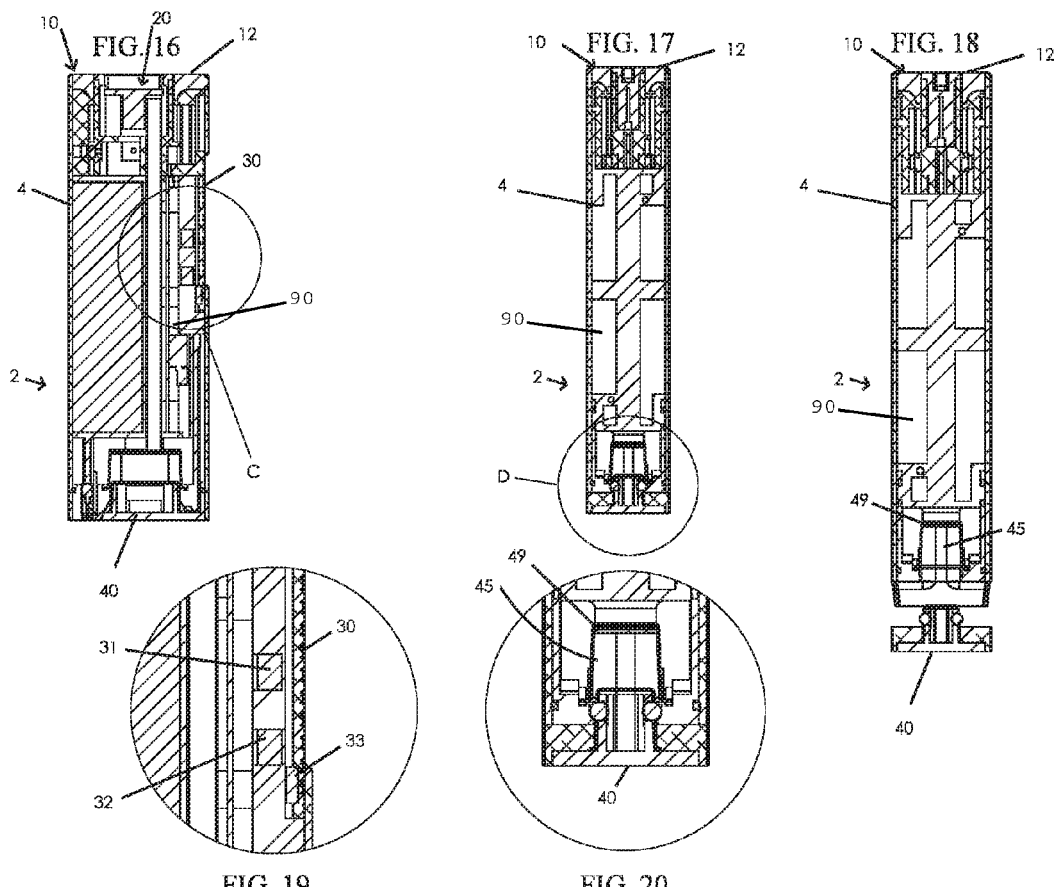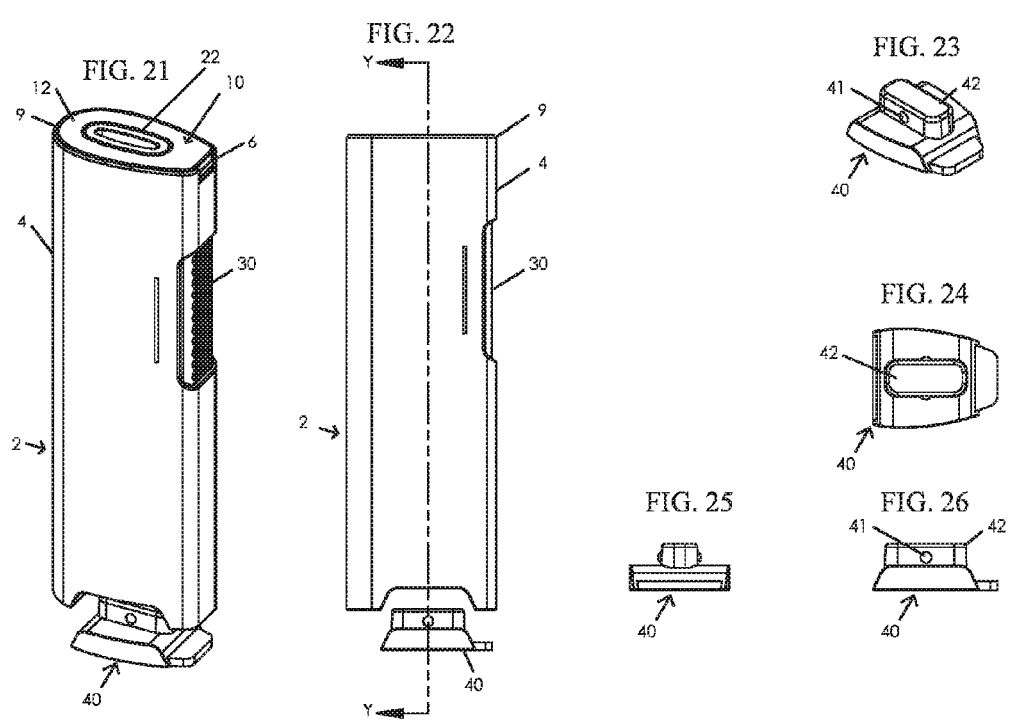

ELECTRONIC CIGARETTE

CROSS REFERENCE TO RELATED APPLICATIONS

This document claims the benefit of the filing date of U.S. Provisional Patent Application 62/156,766, entitled "System of providing a vaporization device that accommodates multiples users with indexing mouthpieces and compact closures and cleaning utensils with attached over covers" to Shotey, which was filed on May 4, 2015, the contents of which are hereby incorporated by reference.

BACKGROUND

Technical Field

Aspects of this document relate generally to electronic cigarettes.

Background Art

It is common within the community of vaporization tobacco devices for users to directly share the device with other individuals within an immediate group. The direct sharing of these devices may contribute to the unhygienic transfer of many medically sensitive organisms that cause human disease.

SUMMARY

According to a first aspect, an electronic cigarette may comprise a housing, a heating assembly positioned within the housing and adapted to heat a liquid solution sufficient to transform the liquid solution to a vapor, a heat sink coupled to the housing and comprising a vapor channel recessed into the heat sink and in fluid communication with a mouthpiece opening, and a vapor passage extending from the heating assembly towards the heat sink, the vapor passage being in fluid communication with the vapor channel and adapted to pass vapor from the heating assembly to the vapor channel, wherein when vapor is withdrawn through the external mouthpiece opening, the vapor passes through the vapor passage, through the vapor channel recessed into the heat sink, and through the mouthpiece opening.

Particular embodiments and implementations of the electronic cigarette may comprise one or more of the following features. A mouthpiece may be detachably coupled to the housing and comprising the heat sink and the mouthpiece opening, wherein the heat sink of the mouthpiece is positioned within a housing recess of the housing and interfaces of a wall of the housing such that vapor passed from the vapor passage to the external mouthpiece opening passes only through the vapor channel recessed into the heat sink. The vapor channel may comprise an entry point recessed into the heat sink and aligned with the vapor passage, and wherein the vapor channel extends from the entry point to an end of the mouthpiece distal the mouthpiece opening, and then extends back to the mouthpiece opening. The vapor channel may comprise two first arms branching from the entry point and meeting proximate the end of the mouthpiece distal the external mouthpiece opening, and two second arms branching from the end of the mouthpiece distal the external mouthpiece opening and meeting proximate the mouthpiece opening. The mouthpiece may be magnetically coupled to the housing with one or more magnet coupled to at least one of the housing and the heat sink. A temperature sensor may be proximate the heating assembly, the temperature sensor may be adapted to detect an ambient air temperature when the heating assembly is activated and a temperature of air drawn into the heating assembly. The temperature sensor may comprise a thermistor and the vaporizer further comprises a processor operably coupled to the thermistor and adapted to increase the heating assembly temperature based upon the ambient air temperature when the heating assembly is activated and the temperature of the air drawn into the heating assembly.

According to a second aspect, an electronic cigarette may comprise a housing, a heating assembly positioned within the housing and adapted to heat a liquid solution sufficient to transform the liquid solution to a vapor, a temperature sensor proximate the heating assembly, the temperature sensor configured to detect an ambient air temperature when the heating assembly is activated and a temperature of air drawn into the heating assembly, a processor positioned within the housing and operably coupled to the temperature sensor and configured to increase the heating assembly temperature based upon the ambient air temperature when the heating assembly is activated and the temperature of the air drawn into the heating assembly.

Particular embodiments and implementations of the electronic cigarette may comprise one or more of the following features. The temperature sensor may comprise a thermistor. A mouthpiece may be detachably coupled to the housing, the mouthpiece comprising a heat sink, an external mouthpiece opening, and a vapor channel recessed into the heat sink and in fluid communication with the external mouthpiece opening, and a vapor passage may extend from the heating assembly towards the mouthpiece, the vapor passage being in fluid communication with the vapor channel and adapted to pass vapor from the heating assembly to the vapor channel, wherein when vapor is withdrawn through the external mouthpiece opening, the vapor passes through the vapor passage, through the vapor channel recessed into the heat sink, and through the external mouthpiece opening. The heat sink of the mouthpiece may be positioned within a housing recess of the housing and interfaces of a wall of the housing such that vapor passed from the vapor passage to the external mouthpiece opening passes only through the vapor channel recessed into the heat sink. The vapor channel may comprise an entry point recessed into the heat sink and aligned with the vapor passage, and wherein the vapor channel extends from the entry point to an end of the mouthpiece distal the mouthpiece opening, and then extends back to the mouthpiece opening. The vapor channel may comprise two first arms branching from the entry point and meeting proximate the end of the mouthpiece distal the external mouthpiece opening, and two second arms branching from the end of the mouthpiece distal the external mouthpiece opening and meeting proximate the mouthpiece opening. The mouthpiece may be magnetically coupled to the housing with one or more magnet coupled to at least one of the housing and the heat sink.

According to a third aspect, an electronic cigarette may comprise a housing comprising a housing recess having a silicone covered steel wall, a heating assembly positioned within the housing and adapted to heat a liquid solution sufficient to transform the liquid solution to a vapor, a mouthpiece coupled to the housing and at least partially positioned within the housing recess, the mouthpiece comprising an external mouthpiece opening, a vapor channel in fluid communication within the external mouthpiece opening, and one or more magnets adapted to magnetically couple to the steel wall of the housing, and a vapor passage extending from the heating assembly towards the mouthpiece, the vapor passage being in fluid communication with the vapor channel and adapted to pass vapor from the heating assembly to the vapor channel, wherein when vapor is withdrawn through the external mouthpiece opening, the vapor passes through the vapor passage, through the vapor channel, and through the external mouthpiece opening.

Particular embodiments and implementations of the electronic cigarette may comprise one or more of the following features. The mouthpiece may comprise a heat sink positioned within the housing recess and interfacing the silicone covered steel wall, and wherein the vapor channel is recessed into the heat sink and in fluid communication with the external mouthpiece opening; and such that vapor passed from the vapor passage to the external mouthpiece opening passes only through the vapor channel recessed into the heat sink. The vapor channel may comprise an entry point recessed into the heat sink and aligned with the vapor passage, and wherein the vapor channel extends from the entry point to an end of the mouthpiece distal the mouthpiece opening, and then extends back to the mouthpiece opening. A temperature sensor may be proximate the heating assembly, the temperature sensor may be adapted to detect an ambient air temperature when the heating assembly is activated and a temperature of air drawn into the heating assembly. The temperature sensor may comprise a thermistor and the vaporizer further comprises a processor operably coupled to the thermistor and adapted to increase the heating assembly temperature based upon the ambient air temperature when the heating assembly is activated and the temperature of the air drawn into the heating assembly. A button receiver may be included on the housing and a bottom cap may be removably coupled the housing at the button receiver, the bottom cap comprising a body, a biased button extending through the body, a bearing channel recessed around the button, and a plurality of ball bearings coupled to the button such that when the button is pressed the plurality of ball bearings retract to the bearing channel to allow a portion of the button to fit within the button receiver and when the button is released the plurality of ball bearings move outside the bearing channel and inhibit the portion of the button from exiting the button receiver.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 1 is a top view of a first embodiment of an electronic cigarette;

FIGS. 2-5 are side views of a first embodiment of an electronic cigarette;

FIG. 6 is a bottom view of a first embodiment of an electronic cigarette;

FIG. 7 is a perspective view of a first embodiment of an electronic cigarette;

FIG. 8 is a side view of a first embodiment of an electronic cigarette with a protruding lip of a reversible ring positioned within the housing and with the mouthpiece assembly retracted;

FIG. 9A is a side view of a first embodiment of an electronic cigarette with a protruding lip of a reversible ring positioned within the housing and with the mouthpiece assembly extended;

FIG. 9B is a perspective view of the first side of the reversible ring;

FIG. 10 is a side view of a first embodiment of an electronic cigarette with a protruding lip of a reversible ring positioned outside the housing and with the mouthpiece assembly retracted;

FIG. 11A is a side view of a first embodiment of an electronic cigarette with a protruding lip of a reversible ring positioned outside the housing and with the mouthpiece assembly extended;

FIG. 11B is a perspective view of a second side of a reversible ring;

FIG. 12 is a cross sectional view taken along line Z-Z of FIG. 5 with the slidable switch in a first position and the mouthpiece assembly retracted;

FIG. 13 is a cross sectional view taken along line Z-Z of FIG. 5 with the slidable switch in a second position and the mouthpiece assembly extended;

FIG. 14 is a close-up view of the area shown in circle A of FIG. 12;

FIG. 15 is a close-up view of the area shown in circle B of FIG. 13;

FIG. 16 is a cross sectional view taken along line Z-Z of FIG. 5 with the slidable switch in a third position and the mouthpiece assembly retracted;

FIG. 17 is a cross sectional view taken along line Y-Y of FIG. 22 with the bottom cap coupled to the housing;

FIG. 18 is a cross sectional view taken along line Y-Y of FIG. 22 with the bottom cap separated from the housing;

FIG. 19 is a close-up view of the area shown in circle C of FIG. 16;

FIG. 20 is a close-up view of the area shown in circle D of FIG. 17;

FIG. 21 is a perspective view of a first embodiment of a electronic cigarette with the bottom cap separated from the housing;

FIG. 22 is a side view of a first embodiment of a electronic cigarette with the bottom cap separated from the housing;

FIG. 23 is a perspective view of a bottom cap;

FIG. 24 is a top view of a bottom cap;

FIG. 25-26 are side views of a bottom cap;

DESCRIPTION

Figure 27:
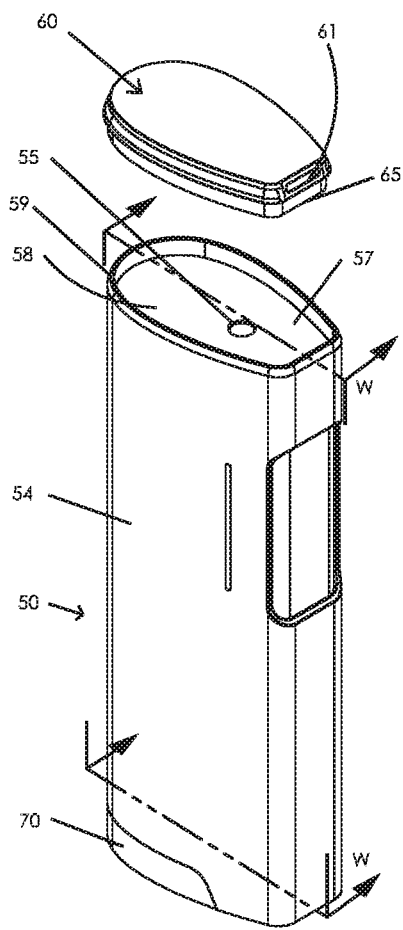
FIG. 27 is a perspective view of a second embodiment of an electronic cigarette with the mouthpiece separated from the housing.

This disclosure, its aspects and implementations, are not limited to the specific components or assembly procedures disclosed herein. Many additional components and assembly procedures known in the art consistent with the intended electronic cigarette and/or assembly procedures for an electronic will become apparent for use with implementations of electronic cigarettes from this disclosure. Accordingly, for example, although particular electronic cigarettes are disclosed, such electronic cigarettes and implementing components may comprise any shape, size, style, type, model, version, measurement, concentration, material, quantity, and/or the like as is known in the art for such electronic cigarettes and implementing components, consistent with the intended operation of an electronic cigarette.

Contemplated herein are various embodiments of electronic cigarettes. Unless otherwise specified, the electronic cigarettes contemplated as part of this disclosure may comprise various elements and features of electronic cigarettes known in the art, such as but not limited to batteries, vaporizers, heating elements, processors, and the like. Embodiments of electronic cigarettes described herein offer numerous advantages and solve various problems common to conventional electronic cigarettes. For example, a heat sink proximate to or in combination with the mouthpiece is configured to cool down the temperature of the vapor inhaled by the user, thus providing a safer and more satisfactory vaping experience. By way of another, non-limiting example, utilizing one or more thermistors proximate the oven or heating assembly and operably coupled to a processor allow a processor to determine when a vaporizer is in use and adjust the temperature of the oven or heating assembly to accommodate the increase of ambient air within the system.

FIGS. 27-38 depict various views of a non-limiting embodiment of an electronic cigarette 50. One or more embodiments of an electronic cigarette 50 comprise a mouthpiece 60 adapted to detachably couple to the electronic cigarette. A mouthpiece 60 may comprise a heat sink 65 and a mouthpiece opening 61. More particularly, a mouthpiece 60 may comprise an external mouthpiece opening that, when coupled to the housing 54 of the electronic cigarette 50, is in fluid communication with a vapor passage 55 within the housing 54. In one or more embodiments, the at least a portion of the heat sink 65 is extends outward from an external cover of the mouthpiece 60. Accordingly, a mouthpiece 60 may be configured to partially nest within a recess 58 on the housing 54. For example, in the non-limiting embodiment shown in FIG. 27, the housing 54 comprises a housing recess 58 on a top or first end of the housing 54. In other embodiments, the housing recess 58 may be positioned elsewhere with the vapor passage 55 extending to the housing recess 58. The heat sink 65 may comprise a depth such that the heat sink 65 interfaces with a wall 57 of the housing recess 58 and an edge of the external cover interfaces with a top edge 59 of the housing 54. According to some aspects, the wall 57 of the housing recess 58 comprises a silicone covered steel wall 57 and the mouthpiece comprises one or more magnets 68 embedded in the heat sink 65 (shown in FIGS. 31 and 32) and adapted to magnetically couple the mouthpiece 60 to the housing 54. In some embodiments, the mouthpiece 60 is separate from the heat sink 65. That is, the heat sink 65 may be removed from or coupled to the electronic cigarette independent of the mouthpiece 60.

One or more embodiments of a mouthpiece 60 comprise a vapor channel 70 recessed in the heat sink 65. The vapor channel 70 is adapted to allow fluid communication from the vapor passage 55, through the vapor channel 70, to the external mouthpiece opening 61. In such an embodiment, interfacing between the heat sink 65 and the wall 57 of the housing recess 58 allows fluid communication between the vapor passage 55 and the external mouthpiece opening 61 only through the vapor channel 70 recessed within the heat sink 65. In a non-limiting embodiment, a vapor channel 70 comprises an entry point 69 aligned with the vapor passage 55 when the mouthpiece 60 is coupled to the housing 54. The vapor channel 70 may extend from the entry point 69 towards as end 62 of the mouthpiece distal or opposite the external mouthpiece piece opening 61 before reversing course and extending to the external mouthpiece 61. More particularly, the vapor channel comprise two first arms 71 branching from the entry point 69 and meeting proximate the end 62 of the mouthpiece 60 distal the external mouthpiece opening 61, and two second arms 72 branching from the end 62 of the mouthpiece distal the external mouthpiece opening 61 and meeting proximate the mouthpiece opening 61 to allow fluid communication between the vapor passage 55 and the external mouthpiece opening 61.

Figure 28:
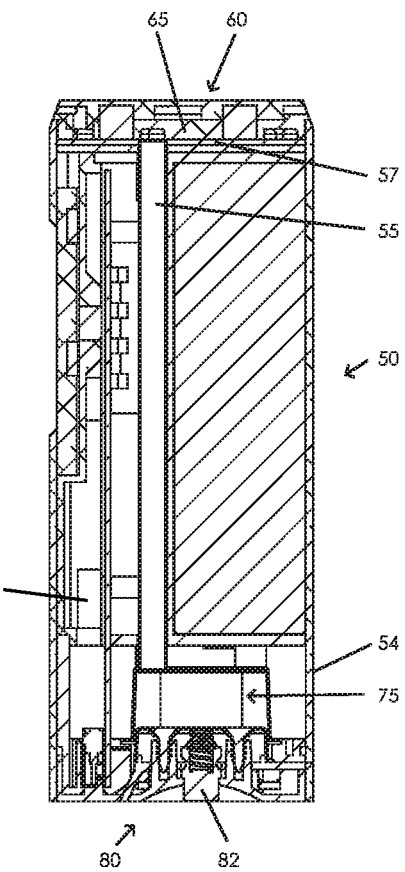
FIG. 28 is a cross sectional view of a second embodiment of an electronic cigarette taken along line W-W of FIG. 27 with the mouthpiece coupled to the housing.
Figure 29:
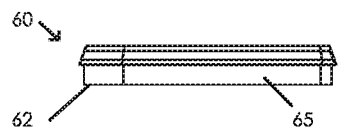
FIGS. 29-30 are side views of the mouthpiece.
Figure 30:
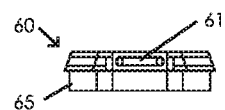
Figure 31:
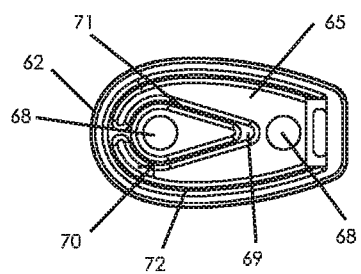
FIG. 31 is a bottom view of the mouthpiece.
Figure 32:
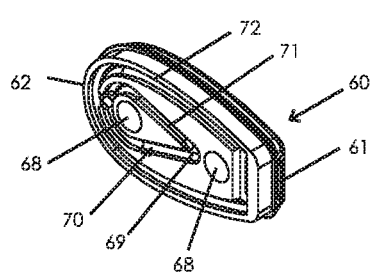
FIG. 32 is a perspective bottom view of the mouthpiece.
Figure 33:
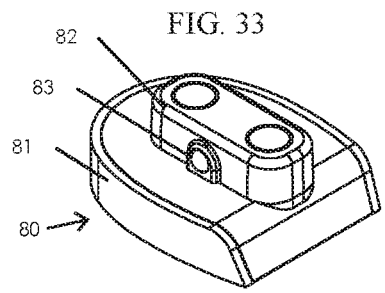
FIG. 33 is a perspective view of a second embodiment of a bottom cap.
Figure 34:
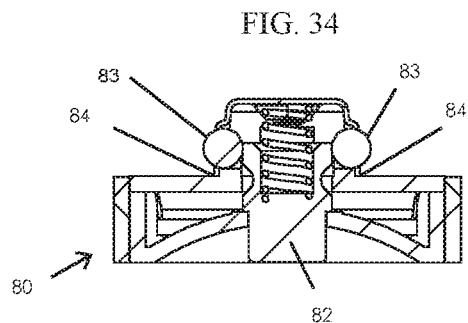
FIG. 34 is a cross sectional view of a second embodiment of a bottom cap taken along line X-X of FIG. 35 with the button in a first position.
Figure 35:
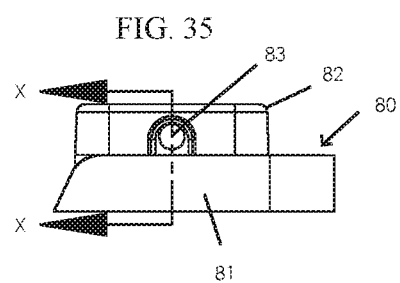
FIG. 35 is a side view of a second embodiment of a bottom cap.
Figure 36:
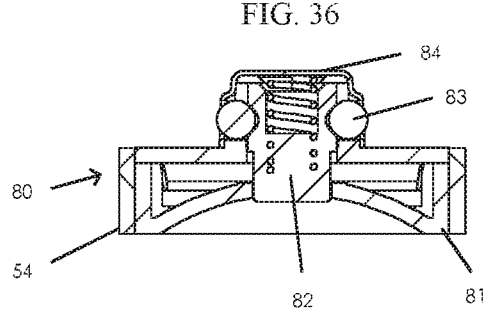
FIG. 36 is a cross sectional view of a second embodiment of a bottom cap taken along line X-X of FIG. 35 with the button in a depressed second position.
Figure 37:
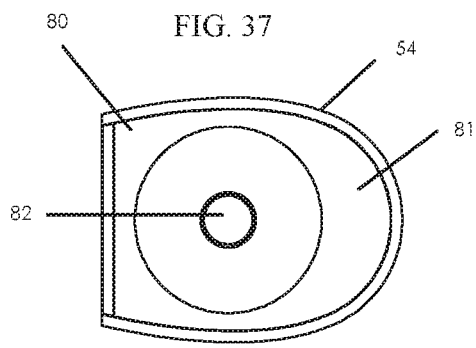
FIG. 37 is a bottom view of a second embodiment of a bottom cap.

One or more embodiments of an electronic cigarette 50 further comprise a vapor passage 55 positioned within the housing 54 and adapted to allow fluid communication between the oven, heating assembly 75, or vaporizer and the external mouthpiece opening 61. FIG. 28 shows a cross sectional view taken along line W-W of a non-limiting embodiment of an electronic cigarette 50 comprises a vapor passage 55 extending from the heating assembly 75 to the wall 57 of the housing recess 58. The oven, heating assembly 75, or vaporizer may comprise any oven, heating assembly, or vaporizer known in the art. Vapor from the oven, heating assembly 75, or vaporizer is caused to be drawn up through the vapor passage 55 when a user draws air from the mouthpiece opening 61.

Figure 39:
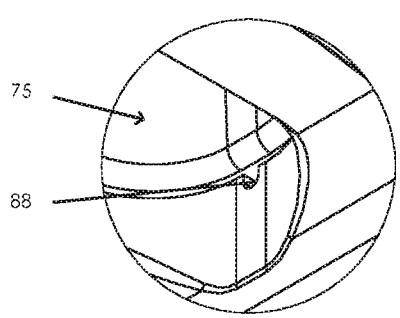
FIG. 39 is a close-up view of circle E of FIG. 38.
Figure 38:
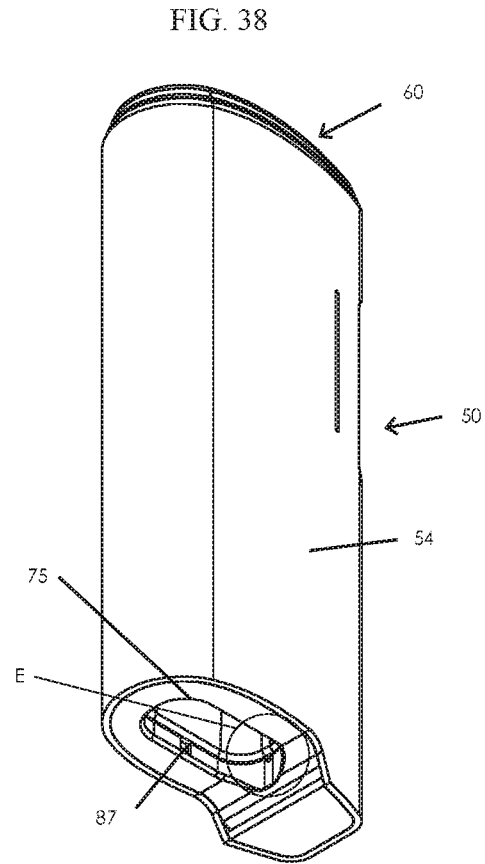
FIG. 38 is a bottom perspective view of a second embodiment of an electronic cigarette with the bottom cap removed.

One or more embodiments of an electronic cigarette comprise a temperature sensor, such as but not limited to a thermistor 88 (shown in FIG. 39). The temperature sensor may be positioned within the housing 54 proximate the heating assembly 75. In some embodiments, the temperature sensor is configured to detect an ambient air temperature when the heating assembly is activated and a temperature of air drawn into the heating assembly when a user inhales or otherwise sucks through the opening 61 of the mouthpiece 60. According to some aspects, a temperature sensor is positioned between a stainless steel oven or other oven of the heating assembly 75 and the plastic body or other housing 54 of the electronic cigarette 50. The temperature sensor may comprise a first end exposed, which detects the ambient air when the oven is turned on as well as the temperature of any air that goes into the oven when the user inhales from the electronic cigarette. This temperature information is then communicated to a processor 90 (see FIGS. 12-13, 16-18 and 28) within the housing 54, which increases the temperature of the heating assembly 75 to quickly heat up the oven to accommodate for the lost heat by the introduction of external air. Knowing the temperature of the ambient air when the electronic cigarette 50 first turns on will set a baseline for how much the heater will have to increase the temperature once the user inhales. For example, the colder the ambient air is, the hotter the heating assembly has to get.

One or more embodiments of an electronic cigarette 50 comprise a bottom cap removably coupled to the housing 54. The bottom cap 80 may be detachably coupled to the housing proximate the oven and/or heating assembly such that the bottom cap acts as an oven lid. While the cap is referenced as a bottom cap herein, it is contemplated that the bottom cap 80 may be positioned anywhere on the housing 54 of the electronic cigarette. FIGS. 33-37 show various views of a non-limiting embodiment of a bottom cap 80. In some embodiments, the bottom cap comprises a body 81, a biased button 82 extending through the body 81, one or more button channels 84 or recesses recessed on or around the button 82, and a plurality of ball bearings 83 coupled to the button 82 such that when the button 82 is pressed the plurality of ball bearings 83 retract to the bearing channel 84 to allow a portion of the button 82 to fit within the button receiver 87, and when the button 82 is released the plurality of ball bearings 83 move outside the bearing channel or recess 84 and inhibit the portion of the button 82 from exiting the button receiver 87. The housing may comprise an internal button receiver 87 positioned to receive the one or more ball bearings to detachably couple the bottom cap 80 to the housing.

Activation of the vaporizer may be initiated through operation of a sliding switch on a side of the housing 54. The sliding switch is biased to a first, rest position and is associated with the processor within the housing 54 that controls operation of the temperature and various modes of the vaporizer. Each time the sliding switch is moved from its rest position to a second, activation position, the processor 90 (see FIGS. 12-13, 16-18 and 28) records the movement as a change in state for the vaporizer. For example, if the rest position is the "up" position for the sliding switch, each time the switch is moved down, the processor 90 changes state. A light bar on a side wall of the vaporizer housing 54 may be used to indicate both the mode and relative temperature of the oven. By non-limiting example, a first downward movement and release of the sliding switch may turn the vaporizer on and cause the light bar to flash a first, lower light of the light bar to indicate a first mode and first temperature setting for the oven. The light bar may then start to increase the quantity of the light bar that is lighted up from none of the light bar being lit to a greater amount of the light bar being lit as the temperature rises, until the light bar is lit to the first, lower light portion of the light bar is lit. A second downward movement and release of the sliding switch may cause the light bar to flash a second, medium light of the light bar to indicate the second mode and second temperature setting for the oven, and the light bar may continue in its slow increase in the light bar lighted length increasing with temperature increase until the higher temperature is reached. Subsequent downward movements and release of the sliding switch may further cause additional flashes, changes to the temperature settings for the processor and oven, and further increase in the light bar lighted length as the temperature increases until the maximum temperature setting has been reached and the light bar is fully lit. After the maximum temperature setting has been reached by downward movements and releases of the sliding switch, an additional downward movement and release of the sliding switch may cause the processor to turn the vaporizer off and allow the user to start the process of turning the vaporizer on and selecting a desired mode again.

In some embodiments, an electronic cigarette 2 comprises a reversible ring 10 proximate the mouthpiece assembly 20. For example, FIGS. 1-26 depict various views of a non-limiting embodiment of an electronic cigarette comprising a reversible ring 10 detachably coupled to the housing 4 of the electronic cigarette 2 proximate the mouth piece 22 of the mouthpiece assembly 20. Like other embodiments, an electronic cigarette 2 may comprise a housing 4 comprising a heating assembly 49 positioned therein. The heating assembly 50 may comprise a heater wrapped around a basket 45, as shown in the non-limiting embodiment of FIG. 20. The heating assembly 49 may comprise any heating assembly known in the art, and a batter 38 positioned within the housing 4 may comprise any battery known in the art.

A reversible ring 10 may be detachably coupled to the housing 4. The reversible ring 10 may comprise a mouthpiece opening 14 extending therethrough, and is configured to removably couple to the housing with a first side 11 exposed and a second side 12 unexposed (as shown in FIGS. 7, 8, and 9A). The reversible ring 10 is also adapted be removed from the housing and removably coupled to the housing 4 with the second side 12 exposed and the first side unexposed 11 (as shown in FIGS. 10 and 11A). In one or more embodiments, the first side 11 of the reversible ring 10 is substantially planar and the second side 12 of the reversible ring 10 comprises a protruding lip 15 surrounding the mouthpiece opening 14. The protruding lip may comprise a filleted edge 16 and extend beyond the top edge 9 of the housing 4 when the reversible ring 10 is coupled to the housing 4 with the second side 12 exposed and the first side 11 unexposed.

In some embodiments, a majority the reversible ring 10 nests or is otherwise positioned within a recess 8 in the housing 4 such that the first side 11 of the reversible ring 10 is substantially planar with a top edge 9 of the housing 4 when the reversible ring 10 is coupled to the housing 4 with the first side 11 exposed and the second side 12 unexposed and an outer periphery 17 of the second side 12 is substantially planar with the top edge 9 of the housing 4 when the reversible ring 10 is coupled to the housing 10 with the second side 12 exposed and the first side 11 unexposed. In one or more embodiments, the top edge 9 comprises a slot 6 and the reversible ring 10 comprises a finger grip 13 exposed within the slot 6 when the reversible ring 10 is coupled to the housing 4.

One or more embodiments of an electronic cigarette further comprises a retractable mouthpiece assembly 20 sized to slide through and interface with the mouthpiece opening 14 of the reversible ring 10. The retractable mouthpiece assembly 20 may be movable between a retracted position (shown, for example, in FIGS. 8 and 12) wherein the mouthpiece 22 of the mouthpiece assembly 20 is positioned at least partially within the housing 4 and does not extend beyond the reversible ring 10, and an extended position (shown, for example, in FIGS. 9A, 11A, and 13) wherein the mouthpiece 22 of the mouthpiece assembly 20 extends beyond the reversible ring 10.

One or more embodiments of an electronic cigarette 2 further comprise a slidable switch 30 coupled to the housing 4 and slidable between a first switch position and at least a second switch position. The slidable switch is operably coupled to the mouthpiece assembly 20 such that sliding the slidable switch 30 to the first switch position (shown in FIGS. 12 and 14) moves the mouthpiece assembly 20 to the retracted position. Sliding the slidable switch 30 to a second switch position (shown in FIGS. 13 and 15) moves the mouthpiece assembly 20 to an extended position. In some embodiments, the slidable switch 30 is slidable to and biased away from a third switch position (shown in FIGS. 16 and 19) such that the switch 30 automatically reverts to one of the first switch position and the second switch position after being moved to the third switch position. Sliding the slidable switch to the third switch position may toggle a temperature setting of the heating assembly 49 housed within the housing 4. More particularly, an electronic cigarette 2 may comprise a first magnet 31 positioned on the housing 4, a second magnet 32 positioned on the housing 4, and a third magnet 33 position on the slidable switch 30 to interface the first magnet and the second magnet 32 as the switch 30 slides. The magnets may be electronically coupled to a processor 90 positioned within the housing such that magnetic interaction (or lack or magnetic interaction) between the third magnet 33 and the first magnet 31 and/or the second magnet 32 in one of the first, second, and/or third positions turns the electronic cigarette on/off, toggles the temperature setting of the heating assembly 49, and/or extends or retracts the mouthpiece assembly 20.

In a non-limiting embodiment, the slidable switch 30 may be slid into the slot 34 such that the third magnet 33 in the switch 30 slides below the second magnet (shown in FIG. 19) and held in this position for two seconds before being released to turn on the electronic cigarette 2. Once released, the magnetic pull of the one or more magnets may return the slidable switch 30 up to the default or first switch position (shown in FIG. 14) wherein the second magnet 32 and the third magnet are magnetically coupled. Moving the switch 30 up to the second position, wherein the third magnet 33 and the first magnet 31 are magnetically coupled in the second position (shown in FIG. 15) may move the mouthpiece assembly to an extended position. A user may slide the slidable switch 30 to the third position (shown in FIG. 19) and hold the slidable switch 30 in this position for less than two seconds to cycle through the temperature settings of the heating assembly 49.

In one or more embodiments, an electronic cigarette 2 comprises a microphone proximate the mouthpiece assembly and a processor 90 electrically coupled to the microphone. The processor 90 may be configured to activate the heater responsive to noise sensed by the microphone when a user inhales through the mouthpiece assembly 20. One or more embodiments of an electronic cigarette 2 further comprise at least one light emitting diode (LED) 46. The at least one LED 46 may comprise a may comprise a multicolor LED configured to display a different color for a different temperature setting. In other embodiments, the at least one LED 46 may comprise a plurality of LEDs, with each LED indicating a different temperature setting.

Some embodiments of an electronic cigarette 2 further comprise a bottom cap 40, such as the non-limiting embodiment of a bottom cap 40 shown in FIGS. 21-26. The bottom cap 40 may comprise one or more ball bearings 41 on either or both sides of a tab 42 extending from the bottom cap 40. The tab 42 is positioned on the bottom cap 40 to couple within the housing 4 of the electronic cigarette proximate and/or adjacent to the basket 40.

In one or more embodiments, an electronic cigarette comprises a housing comprising a heating assembly positioned therein, and a dual mouthpiece coupled to a first end of the housing. The dual mouthpiece may comprise a first mouthpiece and a second mouthpiece adjustable between a first mouthpiece position wherein the first mouthpiece comprises an outer surface of the dual mouthpiece extending from the first end of the housing and at least second mouthpiece position wherein the second mouthpiece comprises the outer surface of the dual mouthpiece extending from the first end of the housing.

Various implementations and embodiment may comprise one or more of the following. When the dual mouthpiece is in the second mouthpiece position, both the first mouthpiece and the second mouthpiece extend from the first end of the housing, the first mouthpiece being positioned within the second mouthpiece. A slidable switch positioned on the housing slidable between a first switch position and at least a second switch position, wherein the slidable switch is operably coupled to the dual mouthpiece such that sliding the slidable switch to the first switch position moves the dual mouthpiece to the first mouthpiece position and sliding the slidable switch to the second switch position moves the dual mouthpiece to the at least second mouthpiece position. The dual mouthpiece may be adjustable between the first mouthpiece position, the second mouthpiece position, and at least a third mouthpiece position wherein neither the first mouthpiece nor the second mouthpiece extend from the first end of the housing, and wherein the slidable switch is slidable between the first switch position, the second switch position, and at least a third switch position that retracts both the first and the second mouthpiece from extending from the first end of the housing. A rechargeable battery positioned within the housing and operably coupled to the heating assembly. A micro universal serial bus (USB) port positioned on a second end of the housing and operably coupled to the rechargeable battery, the housing being configured to stand on a charging dock for recharging of the rechargeable battery through the micro USB port. An oven stoker sized fit within an oven of the heating assembly for cleaning of the oven, the oven stoker being removably coupled to a slot within the housing and comprising a cap positioned to cover the micro USB port when the oven stoker is removably coupled to the housing. A magnetic cover removably coupled to a second end of the housing and positioned such that removal of the magnetic cover allows direct access to an oven of the heating assembly. A power button and one or more LEDs, wherein the heating assembly is operably coupled to the power button and adjustable between a plurality of temperature settings.

According to another aspect, an electronic cigarette comprises a housing comprising a heating assembly positioned therein and a dual mouthpiece coupled to a first end of the housing. The dual mouthpiece may comprise a first mouthpiece and a second mouthpiece adjustable between a first mouthpiece position wherein only the first mouthpiece extends from the housing and at least a second mouthpiece position wherein the second mouthpiece extends from the housing.

Various implementations and embodiments may comprise one or more of the following. When the dual mouthpiece is in the second mouthpiece position, both the first mouthpiece and the second mouthpiece extend from the first end of the housing, the first mouthpiece being positioned within the second mouthpiece. A slidable switch positioned on the housing slidable between a first switch position and at least a second switch position, wherein the slidable switch is operably coupled to the dual mouthpiece such that sliding the slidable switch to the first switch position moves the dual mouthpiece to the first mouthpiece position and sliding the slidable switch to the second switch position moves the dual mouthpiece to the at least second mouthpiece position. The dual mouthpiece may be adjustable between the first mouthpiece position, the second mouthpiece position, and at least a third mouthpiece position wherein neither the first mouthpiece nor the second mouthpiece extend from the first end of the housing, and wherein the slidable switch may be slidable between the first switch position, the second switch position, and at least a third switch position that retracts both the first and the second mouthpiece from extending from the first end of the housing. A rechargeable battery positioned within the housing and operably coupled to the heating assembly. A micro universal serial bus (USB) port positioned on a second end of the housing and operably coupled to the rechargeable battery, the housing being configured to stand on a charging dock for recharging of the rechargeable battery through the micro USB port. An oven stoker sized fit within an oven of the heating assembly for cleaning of the oven, the oven stoker being removably coupled to a slot within the housing and comprising a cap positioned to cover the micro USB port when the oven stoker is removably coupled to the housing. A magnetic cover removably coupled to a second end of the housing and positioned such that removal of the magnetic cover allows direct access to an oven of the heating assembly. A power button operably coupled to the heating assembly, wherein the heating assembly is adjustable between a plurality of temperature settings. One or more LEDs configured to indicate a temperature setting of the plurality of temperature settings of the heating assembly.

According to another aspect, an electronic cigarette comprises a housing comprising a heating assembly and rechargeable battery positioned therein, and at least one mouthpiece positioned proximate a first end of the housing. An electrical port may be positioned on a second end of the housing and operably coupled to the rechargeable battery, the housing being configured to stand on a charging dock for recharging of the rechargeable battery through the electrical port. An oven stoker sized fit within an oven of the heating assembly for cleaning of the oven may be removably coupled to a slot within the housing and comprising a cap positioned to cover the electrical port when the oven stoker is removably coupled to the housing.

Various implementations and embodiments may comprise one or more of the following. The at least one mouthpiece comprises a dual mouthpiece comprising a first mouthpiece and a second mouthpiece adjustable between a first mouthpiece position wherein only the first mouthpiece of the dual mouthpiece extends from the housing and a second mouthpiece position wherein the second mouthpiece extends from the housing. A slidable switch positioned on the housing slidable between a first switch position and at least a second switch position, wherein the slidable switch is operably coupled to the dual mouthpiece such that sliding the slidable switch to the first switch position moves the dual mouthpiece to the first mouthpiece position and sliding the slidable switch to the second switch position moves the dual mouthpiece to the at least second mouthpiece position. The dual mouthpiece may be adjustable between the first mouthpiece position, the second mouthpiece position, and at least a third mouthpiece position wherein neither the first mouthpiece nor the second mouthpiece extend from the first end of the housing, and wherein the slidable switch may be slidable between the first switch position, the second switch position, and at least a third switch position that retracts both the first and the second mouthpiece from extending from the first end of the housing. A magnetic cover removably coupled to the second end of the housing and positioned such that removal of the magnetic cover allows direct access to the oven of the heating assembly. A power button and one or more light emitting diodes (LEDs), wherein the heating assembly is operably coupled to the power button and adjustable between a plurality of temperature settings.

It will be understood that implementations are not limited to the specific components disclosed herein, as virtually any components consistent with the intended operation of a method and/or system implementation for electronic cigarette may be utilized. Accordingly, for example, although particular electronic cigarettes may be disclosed, such components may comprise any shape, size, style, type, model, version, class, grade, measurement, concentration, material, weight, quantity, and/or the like consistent with the intended operation of a method and/or system implementation for an electronic cigarette may be used.

In places where the description above refers to particular implementations of electronic cigarettes it should be readily apparent that a number of modifications may be made without departing from the spirit thereof and that these implementations may be applied to other electronic cigarettes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electronic cigarette, comprising:
   a housing;
   a heating assembly positioned within the housing and adapted to heat a liquid solution sufficient to transform the liquid solution to a vapor;
   a heat sink coupled to the housing immediately adjacent to a mouthpiece opening and comprising a vapor channel recessed into the heat sink and in fluid communication with the mouthpiece opening;
   a manual switch slidably engaged with a side wall of the housing, the manual switch slidable between at least a first position and a second position, the manual switch comprising at least a first magnet with a first polarity positioned on a slidable switch, a second magnet with a second polarity positioned within the housing between the slidable switch and the heating assembly, wherein the first polarity and the second polarity are opposite polarities and attract each other to bias the slidable switch to the first position when moved from the first position to the second position;
   a vapor passage extending from the heating assembly towards the heat sink, the vapor passage being in fluid communication with the vapor channel and adapted to pass vapor from the heating assembly to the vapor channel, wherein when vapor is withdrawn through the external mouthpiece opening, the vapor passes through the vapor passage, through the vapor channel recessed into the heat sink, and through the mouthpiece opening.

2. The electronic cigarette of claim 1, further comprising a mouthpiece detachably coupled to the housing and comprising the heat sink and the mouthpiece opening, wherein the heat sink of the mouthpiece is positioned within a housing recess of the housing and interfaces with a wall of the housing such that vapor passed from the vapor passage to the external mouthpiece opening passes only through the vapor channel recessed into the heat sink.

3. The electronic cigarette of claim 2, wherein the vapor channel comprises an entry point recessed into the heat sink and aligned with the vapor passage, and wherein the vapor channel extends from the entry point to an end of the mouthpiece distal the mouthpiece opening, and then extends back to the mouthpiece opening.

4. The electronic cigarette of claim 3, wherein the vapor channel comprises two first arms branching from the entry point and meeting proximate the end of the mouthpiece distal the external mouthpiece opening, and two second arms branching from the end of the mouthpiece distal the external mouthpiece opening and meeting proximate the mouthpiece opening.

5. The electronic cigarette of claim 2, wherein the mouthpiece is magnetically coupled to the housing with one or more magnet coupled to at least one of the housing and the heat sink.

6. The electronic cigarette of claim 2, further comprising a temperature sensor proximate the heating assembly, the temperature sensor being adapted to detect an ambient air temperature when the heating assembly is activated and a temperature of air drawn into the heating assembly.

7. The electronic cigarette of claim 6, wherein the temperature sensor comprises a thermistor and the vaporizer further comprises a processor operably coupled to the thermistor and adapted to increase the heating assembly temperature based upon the ambient air temperature when the heating assembly is activated and the temperature of the air drawn into the heating assembly.

8. An electronic cigarette, comprising:
   a housing comprising a housing recess having a silicone covered steel wall;
   a heating assembly positioned within the housing and adapted to heat a liquid solution sufficient to transform the liquid solution to a vapor;
   a mouthpiece coupled to the housing and at least partially positioned within the housing recess, the mouthpiece comprising an external mouthpiece opening, a vapor channel in fluid communication within the external mouthpiece opening, and one or more magnets adapted to magnetically couple to the steel wall of the housing;
   a manual switch slidably engaged with a side wall of the housing, the manual switch slidable between at least a first position and a second position, the manual switch comprising at least a first magnet with a first polarity positioned on a slidable switch, a second magnet with a second polarity positioned within the housing between the slidable switch and the heating assembly, wherein interaction between the first and second magnets bias the slidable switch toward the first position; and
   a vapor passage extending from the heating assembly towards the mouthpiece, the vapor passage being in fluid communication with the vapor channel and adapted to pass vapor from the heating assembly to the vapor channel, wherein when vapor is withdrawn through the external mouthpiece opening, the vapor passes through the vapor passage, through the vapor channel, and through the external mouthpiece opening.

9. The electronic cigarette of claim 8, wherein the mouthpiece comprises a heat sink positioned within the housing recess and interfacing the silicone covered steel wall, and wherein the vapor channel is recessed into the heat sink and in fluid communication with the external mouthpiece opening; and such that vapor passed from the vapor passage to the external mouthpiece opening passes only through the vapor channel recessed into the heat sink.

10. The electronic cigarette of claim 9, wherein the vapor channel comprises an entry point recessed into the heat sink and aligned with the vapor passage, and wherein the vapor channel extends from the entry point to an end of the mouthpiece distal the mouthpiece opening, and then extends back to the mouthpiece opening.

11. The electronic cigarette of claim 8, further comprising a temperature sensor proximate the heating assembly, the temperature sensor being adapted to detect an ambient air temperature when the heating assembly is activated and a temperature of air drawn into the heating assembly.

12. The electronic cigarette of claim 11, wherein the temperature sensor comprises a thermistor and the vaporizer further comprises a processor operably coupled to the thermistor and adapted to increase the heating assembly temperature based upon the ambient air temperature when the heating assembly is activated and the temperature of the air drawn into the heating assembly.

13. The electronic cigarette of claim 8, further comprising a button receiver on the housing and a bottom cap removably coupled the housing at the button receiver, the bottom cap comprising a body, a biased button extending through the body, a bearing channel recessed around the button, and a plurality of ball bearings coupled to the button such that when the button is pressed the plurality of ball bearings retract to the bearing channel to allow a portion of the button to fit within the button receiver and when the button is released the plurality of ball bearings move outside the bearing channel and inhibit the portion of the button from exiting the button receiver.

14. An electronic cigarette, comprising:
   a housing;
   a heating assembly positioned within the housing and adapted to heat a substance to generate a vapor from the substance;
   a mouthpiece coupled to the housing and at least partially positioned within the housing recess, the mouthpiece comprising an external mouthpiece opening, a vapor channel in fluid communication within the external mouthpiece opening and the heating assembly;
   a heat sink coupled to the housing between the heating assembly and the mouthpiece;
   a manual switch slidably engaged with a side wall of the housing, the manual switch slidable between at least a first position and a second position, the manual switch comprising at least a first magnet with a first polarity positioned on a slidable switch panel, a second magnet with a second polarity positioned within the housing between the slidable switch panel and the heating assembly, wherein the first polarity and the second polarity react to each other to bias the slidable switch toward the first position at least when moved from the first position to the second position.

15. The electronic cigarette of claim 14, further comprising a temperature sensor within the heating assembly and adapted to measure a temperature of the substance within the heating assembly during generation of the vapor.

16. The electronic cigarette of claim 14, wherein the mouthpiece is detachably coupled to the housing and the heat sink is formed within the mouthpiece, the heat sink comprising a vapor channel in fluid communication with the external mouthpiece opening, the vapor channel being recessed into a surface of the heat sink, wherein the vapor channel extends from an entry point to an end of the mouthpiece distal to the external mouthpiece opening, and then extends back to the external mouthpiece opening.

17. The electronic cigarette of claim 16, wherein the vapor channel comprises two first arms branching from the entry point and meeting proximate the end of the mouthpiece distal the external mouthpiece opening, and two second arms branching from the end of the mouthpiece distal the external mouthpiece opening and meeting proximate the external mouthpiece opening.

18. The electronic cigarette of claim 14, wherein the mouthpiece is removably and magnetically coupled to the housing with one or more magnets.

19. The electronic cigarette of claim 14, wherein the manual switch further comprises a third magnet positioned between the slidable switch panel and the heating assembly, the third magnet arranged to indicate to a processor within the housing when the slidable switch is moved to the second position.

* * * * *